July 7, 1970  R. D. BARNES  3,519,294
INTERNAL FERRULE JOINT
Filed Jan. 27, 1967
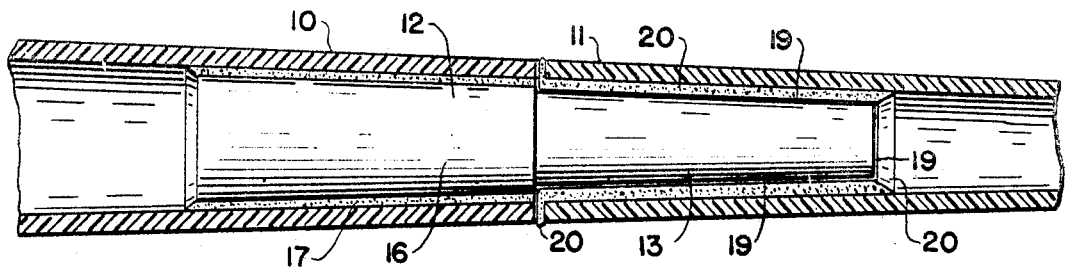
FIG. 1
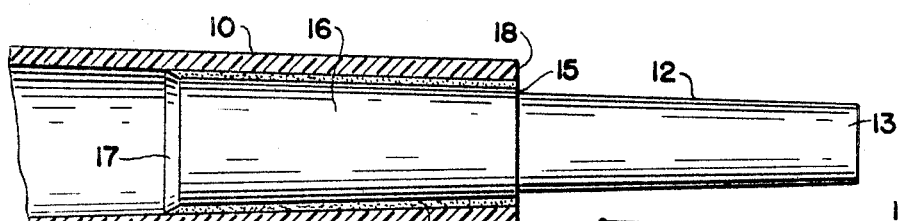
FIG. 6   FIG. 7
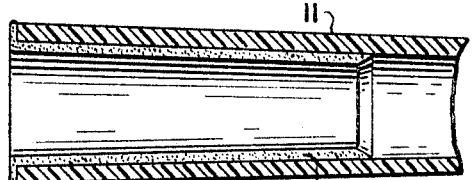
FIG. 2   FIG. 3
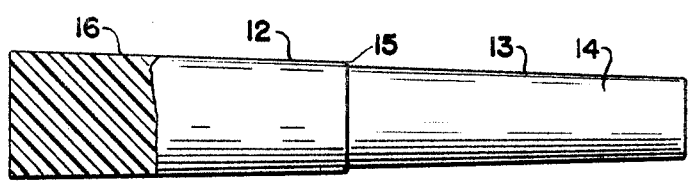
FIG. 4
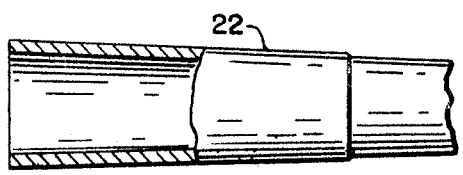
FIG. 5
*INVENTOR:*
RICHARD D. BARNES
BY
*ATTORNEY*

United States Patent Office 3,519,294
Patented July 7, 1970

3,519,294
INTERNAL FERRULE JOINT
Richard Dwight Barnes, Costa Mesa, Calif., assignor to The Conolon Corporation, a corporation of California
Filed Jan. 27, 1967, Ser. No. 612,139
Int. Cl. F16b 7/04
U.S. Cl. 287—126                    2 Claims

ABSTRACT OF THE DISCLOSURE

This invention provides for the demountable end to end connection of tubular sections by means of an internal member. The internal member is fixed in one tubular section to have a projecting end. The projecting end of the internal member, which is finished to exact dimensions, is used as a male mold to form the inner surface of other tubular sections.

BACKGROUND OF THE INVENTION

In the manufacture of fiberglass tubes for use as fishing rods and the like, it is difficult and costly to provide exact internal diameters and high tolerance internal finishes. Thus plug type joints providing firm connections and interchangeability for assembling demountable tubular sections of fishing rods and the like have heretofore been difficult and expensive to provide.

SUMMARY OF THE INVENTION

An internal ferrule or internal member has one end which is precisely formed into a taper. The other end of the internal member is glued or otherwise fixed in a first tubular section with the taper projecting from its end. The projecting taper is coated with a mold release agent and then a deformable plastic glue or the like is thickly spread over it. The glue covered taper is formed into the end of a second tubular section so that the taper acts as a male mold while the glue hardens. With a twist, the sections are broken apart at the mold release agent to provide a high tolerance plug type joint.

Since external tapers on internal members may be easily, precisely and identically formed, the internal ferrule joint of this invention provides interchangeability between tubular sections. No costly and structurally weakening internal machining of the end of a tubular section is required to obtain a precise fit. Further, this invention provides a high production rate at a low cost. Finally, the internal ferrule, if made of metal, is covered by the tube sections while assembled, which protects it to minimize its corrosion and in the case of fishing rods provides a desirable smooth exterior. Many other advantages of this invention reside in its particular construction in one combination of its parts, and in the process of its manufacture as will be apparent from the following description and accompanying drawing.

BRIEF DESCRIPTION OF THE DRAWING

FIG. 1 is a longitudinal, vertical section through two broken away ends of tubular sections being demountably joined according to this invention;

FIGS. 2 and 3 are longitudinal, vertical sections through the broken away ends of two tubular members to be demountably joined according to this invention;

FIGS. 4 and 5 are side views, partly broken away in vertical section, of, respectively, a plastic and a metal internal ferrule;

FIG. 6 is a longitudinal, vertical section of the broken away end of a tubular section having an internal ferrule fixed therein to project therefrom according to this invention; and FIG. 7 is a longitudinal, vertical section through a broken away end of a tubular section prepared to receive an internal ferrule.

DESCRIPTION OF THE PREFERRED EMBODIMENT

Referring to the drawing in detail, two tubes 10 and 11, shown in FIGS. 2 and 3, are to be demountably joined end to end. The tubes 10 and 11 are of fiber glass and may be, respectively, the butt section and the tip section of a fishing rod. As shown in FIG. 4, an internal ferrule or internal member 12 of plastic is molded or machined to have a tapered front portion 13 with a high tolerance outer surface 14. A slight step or shoulder 15 defines the rearmost extension of the surface 14. As may be seen in FIG. 6, the rear portion 16 of the internal member 12 is fixed by a suitable glue 17 in tube 10 with the shoulder 15 exactly aligned with the front edge 18 of tube 10. The glue 17 is given time to set.

The front edge 18 of tube 10 and the tapered front portion 13 of internal member 12 are coated, as by spraying or dipping, with a thin film of a mold release agent 19 as shown in FIG. 1. The mold release agent 19 could be a fluorocarbon spray or the like. Thus coated front edge 18 of the tube 10 and the tapered front portion 13 of member 12 are then thickly coated with a glue or molding material 20 such as a quick setting epoxy. Such a molding material 20 may be an epoxy made by mixing ursamid and epon. The covered tapered end 13 is then thrust into the end of tube 11, as shown in FIG. 1, and the epoxy or other molding material 20 is allowed to cure or set. If desired, the molding material 20 may be placed in the tube 11 and the tapered end 13, coated with a mold release agent 19, may be thrust into it.

After the epoxy or molding material 20 has cured, a sharp relative twisting of the tubes 10 and 11 breaks the member 10 and 13 from the molding material 20 at the mold release agent coating 19. The separated sections of tubing 10 and 11, as shown in FIGS. 6 and 7, may then be re-joined with a substantially perfect fit.

As shown in FIG. 5, a tubular metal internal ferrule 22 may be used in place of the plastic internal member 12. It is used in exactly the same manner.

If desired, jigs may be used to align the internal members 12 or 22 while they are being glued within the tubes 10. Such jigs may also longitudinally position the internal members 12 or 22 within the tubes 10 so that their tapered front portions 13 project the same exact distance out of the tubes 10. This may be accomplished by having a suitable jig align the shoulder 15 of each internal member 12 with the end 18 of each tubular section 10. Additional jigs may be used to ensure the correct alignment of tubes 10 and 11 while the tapered ends 13 of the internal members 12 or 22 serve as molds.

Since the internal members 12 and 22 need only have their tapered front portions accurately formed by molding or machining, they may be inexpensively made. With accurately and identically formed front portions 13, the tubes 10 may be interchangeably joined end to end with tubes 11.

While the tubes 10 and 11 are shown as being tapered fiber glass tubes and are described as being the butt and tip sections of fishing rods, this invention is not so limited and may be used and practiced otherwise.

I claim:
1. A pair of hollow tapered fiberglass tubes demountably joined end to end, a plastic internal ferrule interconnecting said tubes, said ferrule having a rearward portion, means securing said rearward portion into the first of said tubes, said ferrule having a forward portion formed with a high tolerance forwardly tapered surface, a molded material within the second of said tubes, a mold release agent on said forward high tolerance surface of said ferrule, and said forward surface with said release agent being positioned between said molded material in said second tube whereby said tubes are demountably joined.

2. The combination according to claim 1 wherein said ferrule has a shoulder separating said high tolerance forward surface from said rearward portion and said shoulder is positioned in alignment with the front end of said first tube.

References Cited

UNITED STATES PATENTS

| | | | |
|---|---|---|---|
| 2,536,388 | 1/1951 | Murray | 287—126 XR |
| 3,081,644 | 3/1963 | Hudgens et al. | |
| 3,310,903 | 3/1967 | Binvignat | 43—18 |
| 3,334,901 | 8/1967 | Steffes | 287—108 XR |
| 3,406,993 | 10/1968 | Haynes | 43—18 XR |

DAVID J. WILLIAMOWSKY, Primary Examiner

A. KUNDRAT, Assistant Examiner

U.S. Cl. X.R.

43—18